US009236674B2

(12) United States Patent
Rabinovitz

(10) Patent No.: US 9,236,674 B2
(45) Date of Patent: Jan. 12, 2016

(54) INTERFACE CARD ASSEMBLY FOR USE IN A BUS EXTENSION SYSTEM

(71) Applicant: Josef Rabinovitz, Tarzana, CA (US)

(72) Inventor: Josef Rabinovitz, Tarzana, CA (US)

( * ) Notice: Subject to any disclaimer, the term of this patent is extended or adjusted under 35 U.S.C. 154(b) by 0 days.

(21) Appl. No.: 14/017,282

(22) Filed: Sep. 3, 2013

(65) Prior Publication Data

US 2015/0064939 A1 Mar. 5, 2015

(51) Int. Cl.
*H05K 7/02* (2006.01)
*H01R 12/72* (2011.01)
*G06F 1/18* (2006.01)

(52) U.S. Cl.
CPC .............. *H01R 12/721* (2013.01); *G06F 1/185* (2013.01)

(58) Field of Classification Search
CPC ....................................... H01R 12/721
USPC .......................................................... 439/65
See application file for complete search history.

(56) References Cited

U.S. PATENT DOCUMENTS

| 5,604,332 | A  | * | 2/1997 | Ikeda ................... H01R 9/2466 |
| | | | | 174/138 R |
| 6,506,059 | B2 | * | 1/2003 | Bishop et al. .................... 439/66 |
| 6,773,274 | B2 | * | 8/2004 | Tripod ............... H01R 33/7635 |
| | | | | 439/699.2 |
| 6,945,786 | B2 | * | 9/2005 | Ammar et al. ................... 439/65 |
| 6,974,344 | B2 | * | 12/2005 | Comerci ........................ 439/329 |
| 7,112,067 | B1 | * | 9/2006 | Korsunsky et al. .............. 439/65 |
| 7,114,958 | B2 | * | 10/2006 | Angelucci ....................... 439/65 |
| 7,189,079 | B2 | * | 3/2007 | Noda ..................... H01R 4/028 |
| | | | | 439/66 |
| 7,537,458 | B2 | * | 5/2009 | Idzik et al. ....................... 439/65 |
| 7,556,501 | B2 | * | 7/2009 | Morita ..................... H05K 7/12 |
| | | | | 361/759 |
| 7,591,649 | B2 | * | 9/2009 | Yen et al. ......................... 439/65 |
| 7,785,140 | B2 | * | 8/2010 | Henry ......................... 439/541.5 |
| 8,043,120 | B2 | * | 10/2011 | Tsai et al. ....................... 439/629 |
| 8,137,138 | B2 | * | 3/2012 | Dowhower et al. ........... 439/626 |
| 2004/0214466 | A1 | * | 10/2004 | Lin ......................... H05K 1/142 |
| | | | | 439/325 |
| 2006/0286858 | A1 | * | 12/2006 | Uchida ................ H01R 12/721 |
| | | | | 439/495 |
| 2007/0117417 | A1 | * | 5/2007 | O'Brien ................. H05K 1/142 |
| | | | | 439/65 |
| 2011/0045678 | A1 | * | 2/2011 | Chang ................... B81B 7/0006 |
| | | | | 439/59 |
| 2011/0212639 | A1 | * | 9/2011 | Paquette .............. H01R 12/721 |
| | | | | 439/260 |
| 2012/0033370 | A1 | * | 2/2012 | Reinke ................ G06F 13/4068 |
| | | | | 361/679.4 |
| 2013/0016498 | A1 | * | 1/2013 | Naito .................... G02B 6/0083 |
| | | | | 362/97.1 |
| 2014/0301052 | A1 | * | 10/2014 | Chen ....................... H05K 3/32 |
| | | | | 361/760 |
| 2015/0064939 | A1 | * | 3/2015 | Rabinovitz .............. G06F 1/185 |
| | | | | 439/65 |

* cited by examiner

*Primary Examiner* — James Harvey
(74) *Attorney, Agent, or Firm* — W. Edward Johansen

(57) ABSTRACT

An interface card assembly of a bus extension system for coupling a solid state drive to a host bus adaptor of a host computer includes a printed circuit board having an edge connector with a plurality of pins and a plurality of first conducting traces. The interface card also includes a plurality of first serially aligned plated holes disposed along a first center-line having a first end and a second and being disposed perpendicularly to the edge connector and a slot. The slot is milled in the printed circuit board so that the slot is parallel and adjacent to the first center-line and extends beyond the first and second ends thereby leaving each of the first plated holes in a semi-circular shape.

3 Claims, 18 Drawing Sheets

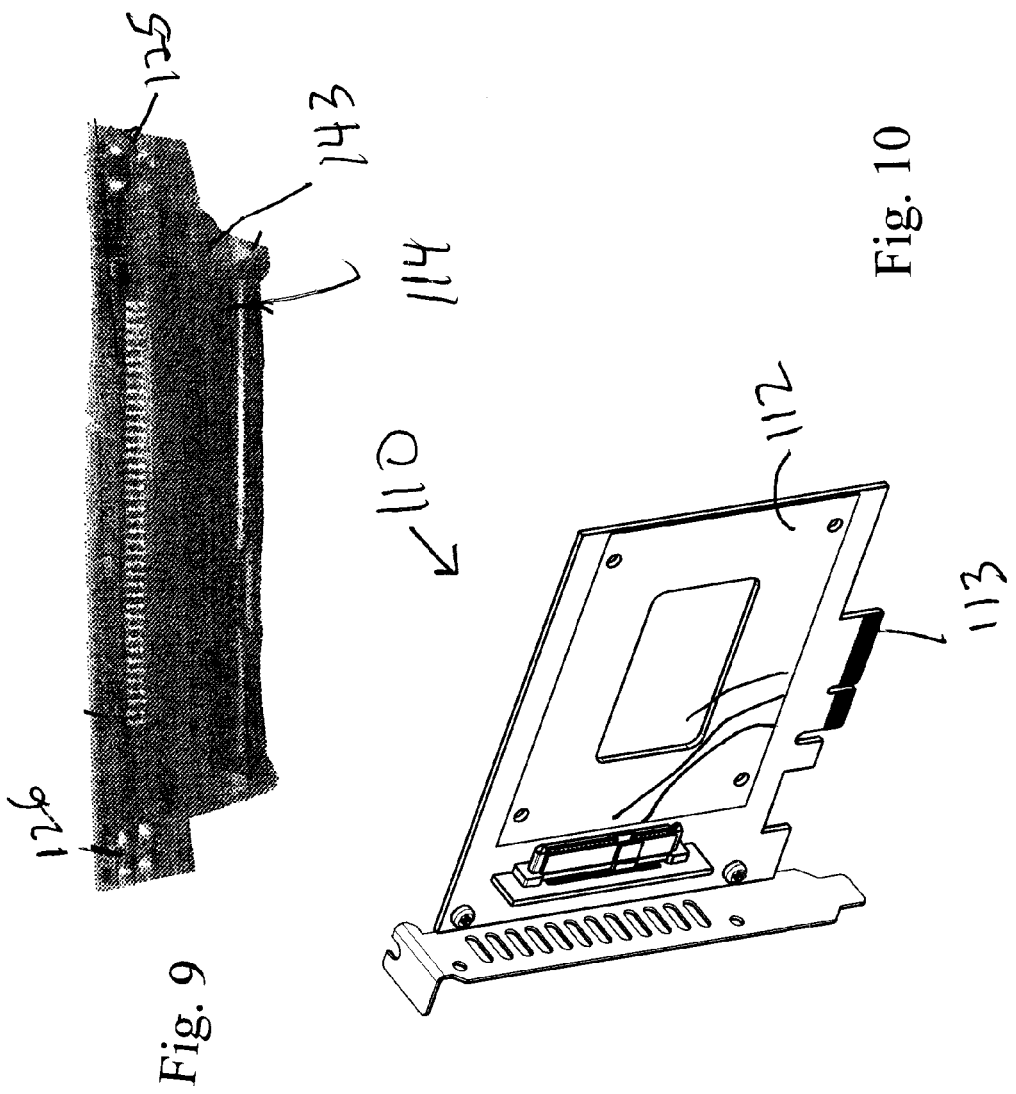

INTERFACE CARD ASSEMBLY FOR USE IN A BUS EXTENSION SYSTEM

BACKGROUND OF THE INVENTION

1. Field of the Invention

The present invention generally relates to PCI Express (PCIe) technology, and in particular a bus extension system and method for adapting PCIe technology to current and future computer systems.

2. Description of the Prior Art

U.S. Patent Application No. 2012/0033370 teaches an interface card of a bus extension system which connects a PCIe-compliant peripheral device to a PCIe bus of a computer system. The interface card includes a printed circuit board and an edge connector adapted for insertion into an expansion slot on a motherboard of the computer system, and transmits signals between the motherboard and the interface card. An interface port is configured to mate with a connector of the cable and a logic integrated circuit on the printed circuit board. The logic integrated circuit functionally connects the edge connector with the expansion slot in order to buffer and propagate clock and data signals there-between that are compliant with a PCIe standard. The interface card and cable lacks the capability of transmitting power there-through to a PCIe-compliant peripheral device connected to the interface card through the interface port.

PCIe, formerly known as 3r.sup.d generation I/O (3GIO), has replaced the former peripheral component interconnect (PCI) parallel multi-drop bus as the main interconnect within current computer systems. In contrast to PCI, PCIe uses multiple lanes in parallel for each link. Each link constitutes a serial point-to-point connection and includes differential pairs for sending and receiving data in full duplex mode.

The currently prevalent PCIe 2.x standard features 500 MB/sec bandwidth per differential pair. In a PCIe 8× configuration (eight lanes), this results in a maximum of 8 GBs data transfers using concurrent send and receive transactions. The bandwidth of each PCIe link may be linearly scaled by adding signal pairs into a multi-lane configuration that can be custom tailored to the target (peripheral) device. Likewise, a multi-lane link may be split into several different targets. The width of each link or sub-link is negotiated at the initialization of each peripheral. At the end-point, the data that can be viewed as a byte stream are assembled/disassembled into the different lanes by the physical layer.

Given the high bandwidth and flexibility of the PCIe as an interconnect, it appears an unnecessary limitation to confine target devices to the physical location of an expansion card that is inserted into a PCIe slot of a computer. Rather, given space constraints as well as power and thermal management concerns, it would be advantageous to have target devices moved away from the motherboard and provide a high speed data link (HSDL) via dedicated cabling between an adapter card and the peripheral target device.

Referring to FIG. 1 a prior art bus expansion system is capable of providing flexible configurations for connecting PCIe-compliant peripheral devices to a host computer system using a cable that connects the peripheral devices to a PCIe bus on a motherboard of the computer system. PCIe protocol allows for concurrent send and receive transfers over dedicated differential signaling pairs of wires in full duplex mode. PCIe signals are routed from a PCIe expansion slot on the motherboard through a PCIe interface (expansion) card via an edge connector of the interface card. The edge connector of the PCIe interface card typically uses a 4-lane interface, though interface configurations up to 16-lanes are possible.

The bus expansion system is advantageously able to make use of standard and relatively low-cost cables and connectors that are mounted on an adapted circuit board so that the pin-out connectivity on the interface card and the peripheral device has a mirrored configuration.

Still referring to FIG. 1 the bus extension system 10 is used with a host computer 12 and includes an interface card 14 that has been installed within an enclosure 16 in the computer 12. The interface card 14 is connected with a cable 18 to one of any number of PCIe-compliant peripheral devices 20 that are compatible with PCIe technology. The peripheral device 20 is represented as including a Serial ATA (SATA)-based solid state drive (SSD) controller 21 for controlling four solid-state drives (SSDs) 22. The interface card 14 and cable 18 are configured to provide a high speed data link (HSDL) between the computer 12 and the peripheral device 20. The PCIe-compliant peripheral devices 20 may include NAND flash-based mass storage devices capable of interfacing with a PCIe bus through suitable logic. The peripheral devices 20 can be PCIe first generation or second generation or later compliant, preferably using at least a 5 gbps (PCIe 2.x compliant) data rate. A non-limiting example of a suitable logic is a four-port PCI-based SATA controller 21 that fans out into four SATA SSDs 22. The SATA SSDs 22 may include an array of NAND flash-based mass storage devices located at the back end of the logic. The SATA controller 21 serves as host bus adapter for the SATA SSDs 22 used as the permanent storage media. The PCIe signals can be converted into PCI-X signals with a converter 23, for example, using a Pericom P17C9X130PCI Express to PCI-X Reversible Bridge, which then connects to the SATA controller 21. Other mapping strategies and non-volatile memory technologies could be used. The PCIe interface card 14 may be equipped with either four interface ports 24 or a single interface port 24. Each interface card 14 includes a printed circuit board, a bracket for mounting the circuit board within the computer enclosure 16 and an edge connector configured to connect the interface card 14 with a PCIe expansion slot (not shown) on a motherboard 30 mounted within the enclosure 16. Alternatively the edge connector can be functionally connected to the PCIe expansion slot on the motherboard 30 through a PCIe riser card (not shown) within the enclosure 16. A female connector forms part of each interface port 24 on the interface cards 14. One end of the cable 18 and a male connector affixed thereto for connecting to the female connector of the interface card 14. The female connector and its complementary male connector are preferably compliant with Small Form Factor (SFF) committee specifications SFF-8086 (currently Rev 2.3) and SFF-8087 (currently Rev. 2.4), which specify what is generally known as the mini Serial Attached SCSI (SAS) form factor, including the form factor known as mini-SAS 4i (wide compact internal connector). As such, the term "mini-SAS" is used herein to define connectors that meet the SFF-8086 and SFF-8087 specifications, and particular example of which is the mini-SAS 4i form factor. Additionally, the cable 18 can be an SFF-8087 compliant internal straight termination cable. As such, the connectors 25 and 32 and the cable 18 can be referred to as mini-SAS connectors and cable, though it should be understood that other types of connectors and cables could be developed and for use with the invention that are compatible with PCIe technology. As mini-SAS connectors, each connector has up to four differential signaling pairs for both transmitting and receiving data, along with a differential reference clock signal pair, a fundamental reset and an I2C interface for serial clock and data. In the form of a mini-SAS cable, the cable 18 is configured to have a "backplane to controller" pinout to achieve complete crossover of all signals, in other words, all thirty-six signals of a mini-SAS 4i connectors cross over. The cable 18 should meet or exceed the electrical specifications defined in the SAS-1.1 or current standard, and typically will be limited to lengths of about 0.5 meter (about 20 inches). Notably, power is not transferred from the motherboard 30 to the peripheral devices 20 through the connectors 25 of the interface ports 24. Mini-SAS connectors and cables are known in the art and therefore, aside from the above, will not be discussed in any further details. The interconnection between the interface card 14 and the PCIe-compliant peripheral device 20 of FIG. 1 is made through an extension of the bus of the motherboard 30 using a flexible cable 18 that can be of a type that is commercially available ("off-the-shelf") and conforms to existing industry standards. In the example given, the cable 18 is a standard mini-SAS 4i cable having male connectors at each end that are configured for mating with a female connector of the interface card 14 and a similar-configured female connector of a PCIe interface port 40 of the peripheral device 20. PCIe functionality and protocol can be maintained throughout the entire configuration so that the interconnection is completely transparent to the host computer 10. In other words, the host computer 10 does not know whether the peripheral devices 20 are connected through the cable 18 or plugged directly into the PCIe interface slot on the motherboard 30. Based on the configuration of the system 10 and cards 14 discussed above, the interface card 14 serves to connect the signal traces of the PCIe expansion slot on the motherboard 30 to the PCIe-compliant peripheral device 20, and in particular the control, data and clock signals transmitted between the motherboard 30 and the SSDs 22 controlled by the four-port SATA controller 21. The interface card 14 connects four PCIe lanes originating on the motherboard 30 to four PCIe lanes in the interface port 24, from where they are transferred through the cable 18 to the receiving port 40 on the peripheral device 20. On the interface card 14, possible signal attenuation and delays stemming from the use of the cable 18 can be compensated for by the use of an integrated PCIe re-driver integrated circuit (not shown) of a type known in the art. The four PCIe lanes are physically combined into a single HSDL channel formed by the cable 18, resulting in the PCIe signals being transmitted over the cable 18 in full duplex mode. The data traces can be routed through the re-driver IC, which acts as a transmit/receive amplifier.

The inventor hereby incorporates all of the above referenced patent into this specification.

SUMMARY OF THE INVENTION

The present invention is generally directed to an interface card assembly of a bus extension system for coupling a solid state drive to a host bus adaptor of a host computer. The interface card includes a printed circuit board having an edge connector with a plurality of pins and a plurality of first conducting traces.

In a first aspect of the present invention the interface card also includes a plurality of first serially aligned plated holes disposed along a first center-line having a first end and a second and being disposed perpendicularly to the edge connector and a slot. The slot is milled in the printed circuit board so that the slot is parallel and adjacent to the first center-line and extends beyond said first and second ends thereby leaving each of the first plated holes in a semi-circular shape. Each first conducting trace electrically couples one of the pins of the edge connector to one of the first plated holes.

In a second aspect of the present invention the interface card further includes a riser card which has a plurality of second conducting traces and a plurality of second serially aligned plated holes disposed along a second center-line and a tongue. Each second conducting trace is electrically coupled to one of the second plated holes. The tongue is snugly inserted into the slot of the printed circuit board so that each first semi-circular plated hole may be soldered to one of the second conducting traces.

In a third aspect of the present invention the interface card still further includes a connector which has a receptacle and a plurality of pins configured for the receptacle. Each second conducting trace is coupled to one of the second pins through one of the second plated holes. The connector is mechanically coupled to the riser card so that the solid state drive may be inserted into the receptacle.

Other aspects and many of the attendant advantages will be more readily appreciated as the same becomes better understood by reference to the following detailed description and considered in connection with the accompanying drawing in which like reference symbols designate like parts throughout the figures.

DESCRIPTION OF THE DRAWINGS

FIG. 9 is a perspective drawing of the riser card and the receptacle of the first PCIe interface card of FIG. 2.

FIG. 10 is a top perspective drawing of the printed circuit board, the two inverted L-shaped conductive supports, the riser card and the receptacle of the interface card of FIG. 2.

DESCRIPTION OF THE PREFERRED EMBODIMENT

Figure 1:
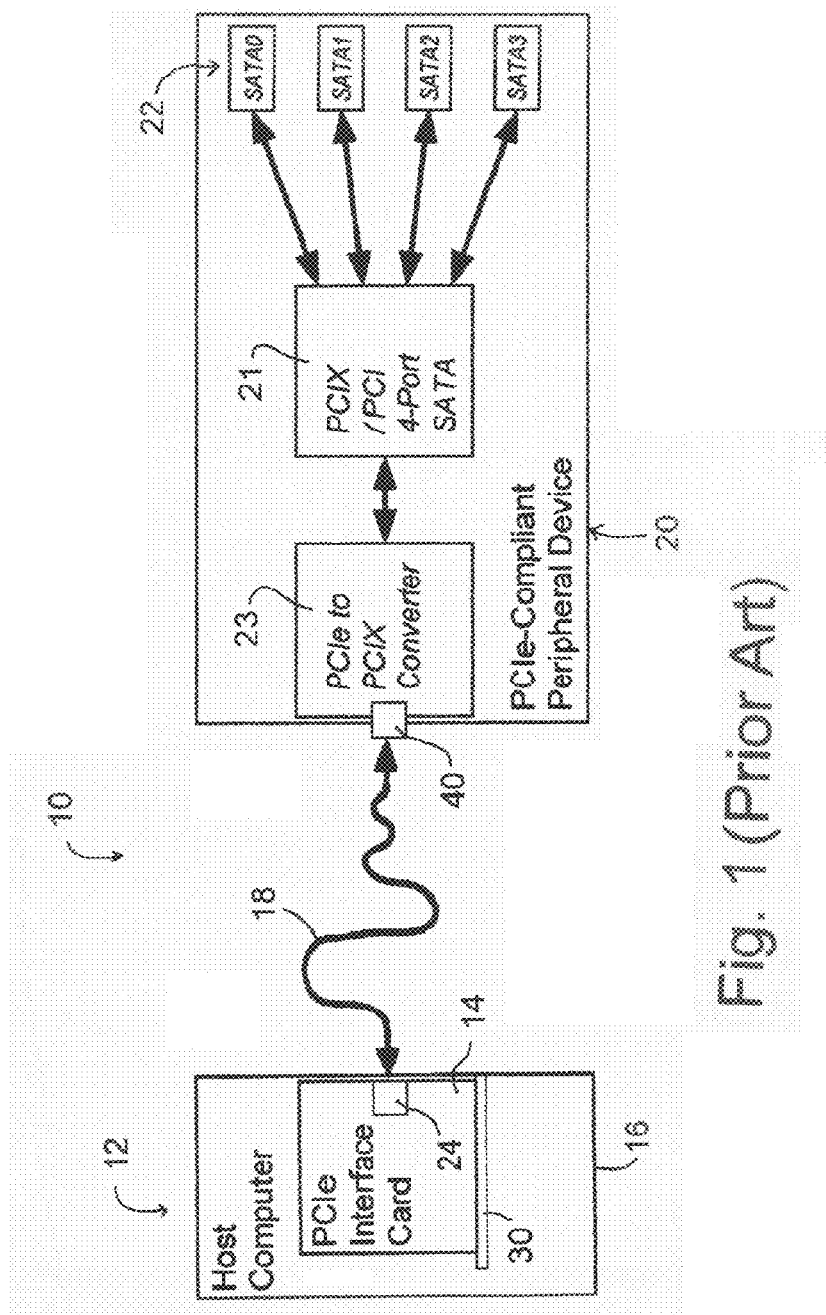
FIG. 1 is a schematic drawing of a functional diagram of a prior art bus extension system, in which an interface card is assembly installed in a host computer and connected with a cable to a PCIe-compliant peripheral device containing four solid-state drives according to U.S. Patent Application No. 2012/0033370.
Figure 2:
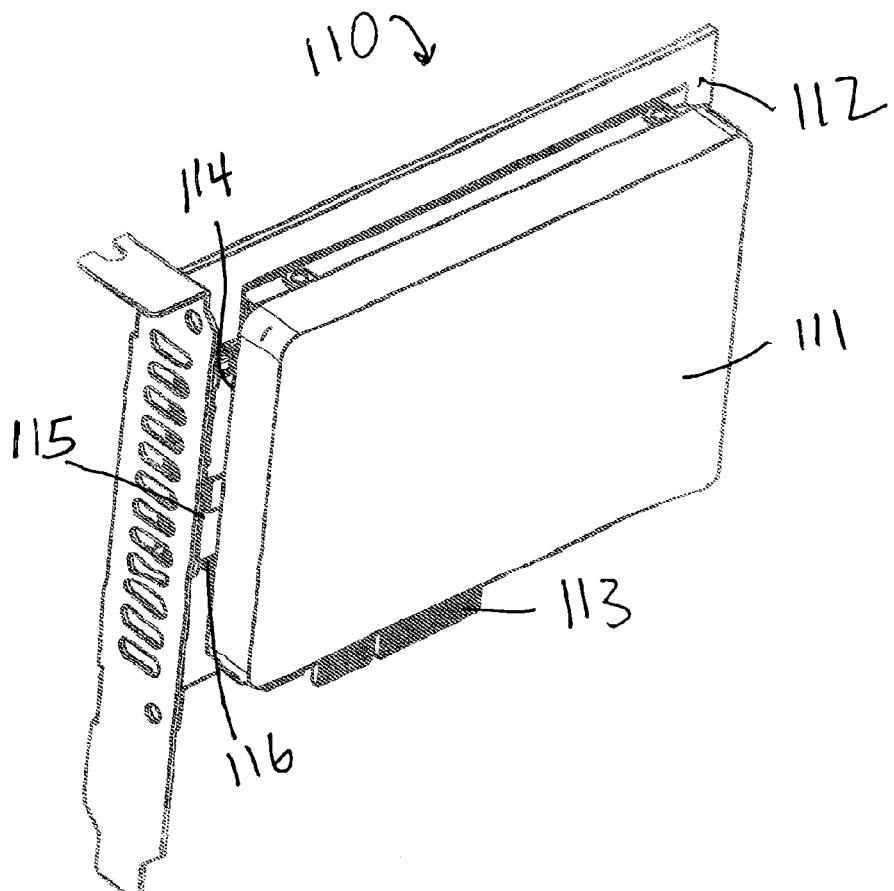
FIG. 2 is a front perspective drawing of a first interface card assembly including a printed circuit board with an edge connector, a riser card, a receptacle and two four pin, inverted L-shaped conductive supports and containing a solid-state drive in accordance with the first embodiment of the present invention.

Referring to FIG. 2 a bus extension system includes a first interface card assembly 110 of a bus extension system which couples a solid state drive 111 to a host bus adaptor of a host computer. The first interface card assembly includes a printed circuit board 112 with an edge connector 113, a riser card 114, a connector 115 and two four pin, inverted L-shaped conductive supports 116.

Figure 4:
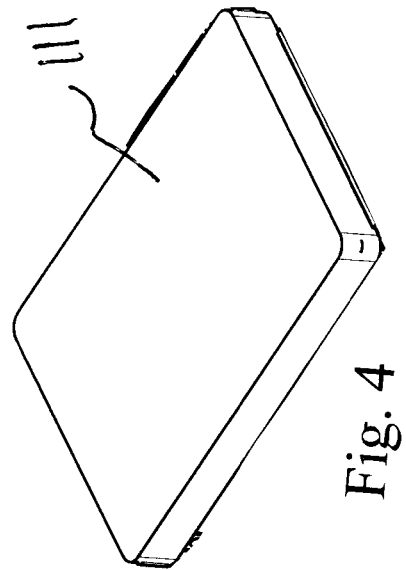
FIG. 4 is a rear perspective drawing of the solid state device of FIG. 2.
Figure 3:
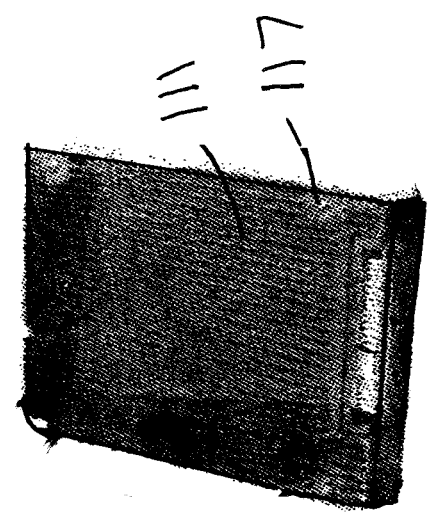
FIG. 3 is a front perspective drawing of the solid state device of FIG. 2 having an integrated connector.

Referring to FIG. 3 in conjunction with FIG. 2 and FIG. 4 Micron as one example manufactures the solid state drive 111. The rear of the solid state drive 111 has a threaded hole 117 in each of its four corners.

Figure 5:
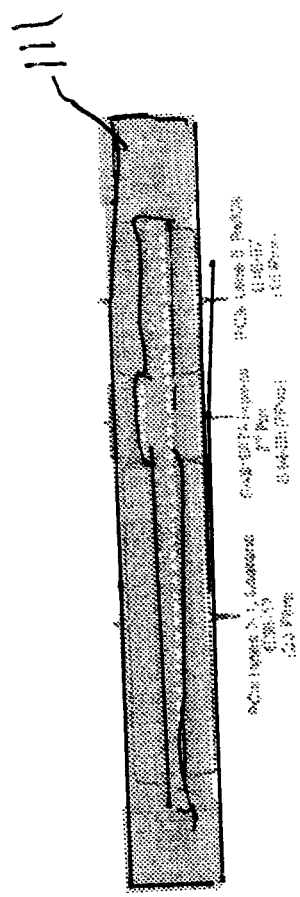
FIG. 5 is a schematic drawing of the pin configuration of the connector of the solid state device of FIG. 2.

Referring to FIG. 5 in conjunction with FIG. 3 the pin configuration of the connector of the solid state device 111 is shown.

Figure 6:
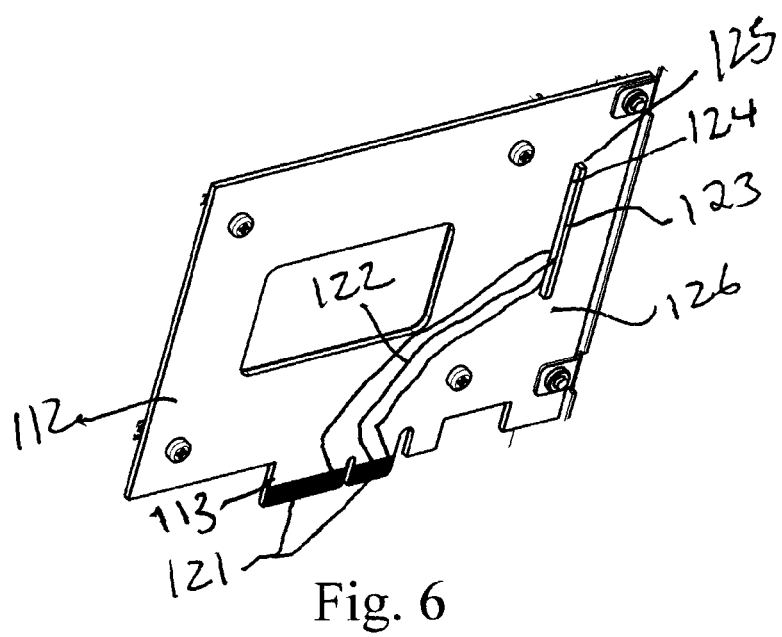
FIG. 6 is a top plan view of the printed circuit board of FIG. 2 having a slot, a plurality of semi-cylindrical plated holes adjacent to the slot, a first plurality of plated holes and a second plurality of plated holes.

Referring to FIG. 6 in conjunction with FIG. 2 the edge connector 113 has a plurality of first pins 121. The printed circuit board 112 has a plurality of first conducting traces 122, a slot 123, a plurality of serially aligned semi-cylindrical plated holes 124 adjacent to the slot 123, a plurality of first plated holes 125 and a plurality of second plated holes 126.

Figure 7:
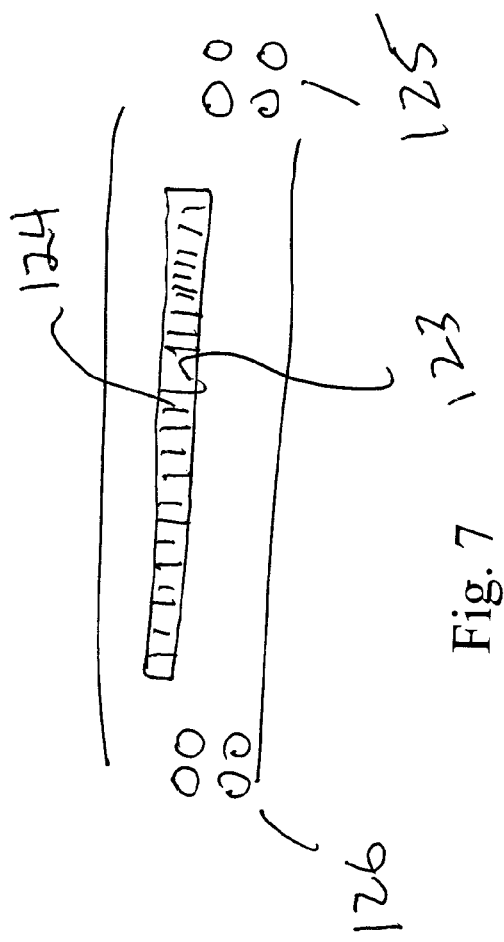
FIG. 7 is an enlarged perspective drawing of the slot and the semi-cylindrical plated holes of the printed circuit board of FIG. 2.

Referring to FIG. 7 in conjunction with FIG. 6 a plurality of first serially aligned semi-cylindrical plated holes 124 are disposed along a first center-line 130 having a first end 131 and a second end 132. The center-line 130 is disposed perpendicularly to the edge connector 113. The slot 123 is milled in the printed circuit board 112 so that the slot 123 is parallel and adjacent to the first center-line 130 and extends beyond the first and second ends 131 and 132 thereby leaving each plated holes 124 in a semi-circular shape. Each first conducting trace 122 electrically couples one of the first pins 121 of the edge connector 113 to one of the serially aligned semi-cylindrical plated holes 124. The first plated holes 125 are disposed on the printed circuit board 112 adjacent to the slot 123. The second plated holes 126 is disposed on the printed circuit board 112 so that each plated hole 126 is aligned with one of the threaded holes 117 on the rear of the solid state drive 111.

Figure 8:
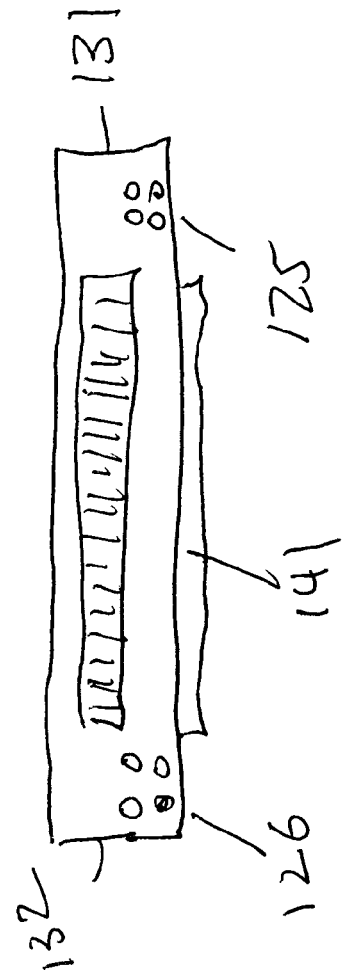
FIG. 8 is a perspective of the riser card of FIG. 2 having a tongue, a plurality of electrical traces, a third plurality of plated holes and a fourth plurality of plated holes.

Referring to FIG. 8 in conjunction with FIG. 2 and FIG. 9 the riser card 114 has a plurality of second conducting traces 141 and a plurality of third serially aligned plated holes 142 disposed along a second center-line 143 and a tongue 144. Each second conducting trace 141 is electrically coupled to one of the third serially aligned plated holes 142. The tongue 144 of the riser card 114 is inserted into the slot 123 of the printed circuit board 112 so that each first semi-circular plated holes 124 may be soldered to one of the second conducting traces 141.

Figure 11:
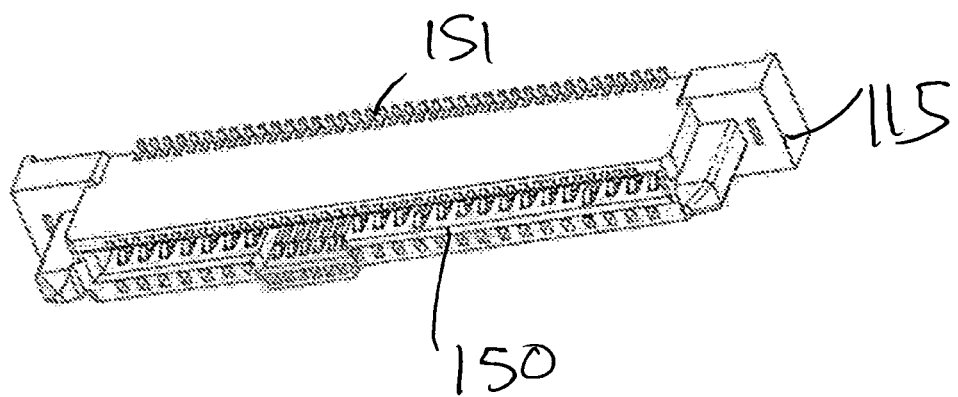
FIG. 11 is a top perspective drawing of a receptacle which may be electrically and mechanically coupled to the connector of the solid state device of FIG. 2.
Figure 12:
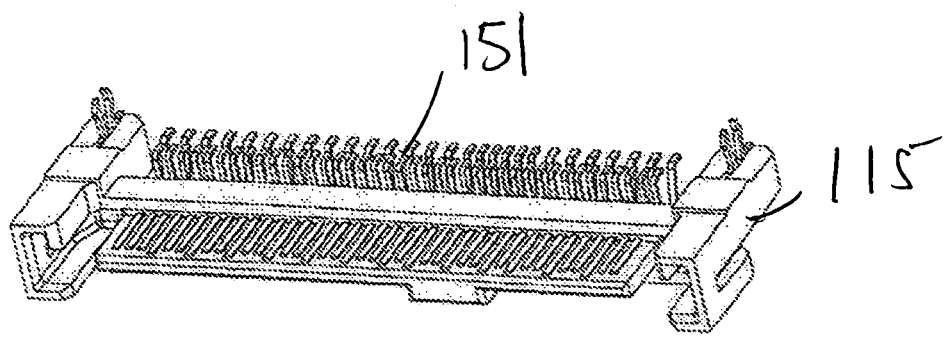
FIG. 12 is a bottom perspective drawing of the receptacle of FIG. 11.
Figure 13:
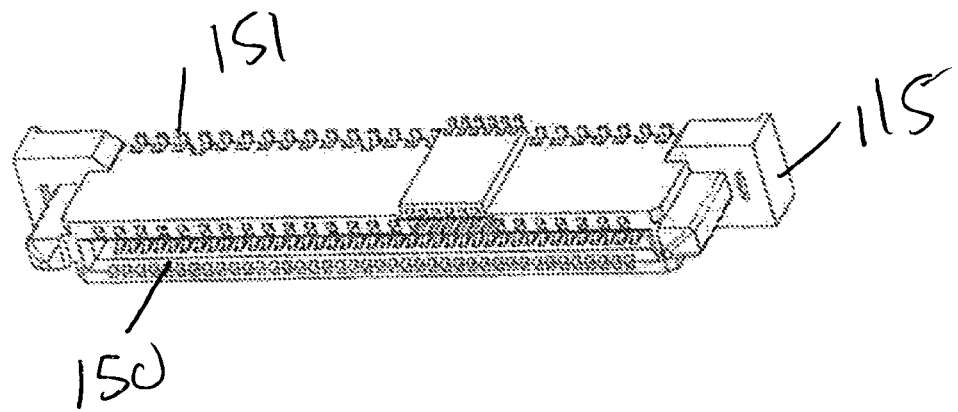
FIG. 13 is a side perspective drawing of the receptacle of FIG. 11.

Referring to FIG. 11 in conjunction with FIG. 10, FIG. 11, FIG. 12 and FIG. 13 a connector 115 has a receptacle 150 and a plurality of second pins 151 configured for the receptacle 150. Each second conducting traces 141 is coupled to one of the second pins 151 through one of the third serially aligned plated holes 142. The connector 115 is mechanically coupled to the riser card 114 so that the solid state drive 111 may be inserted into the receptacle 150

Figure 14:
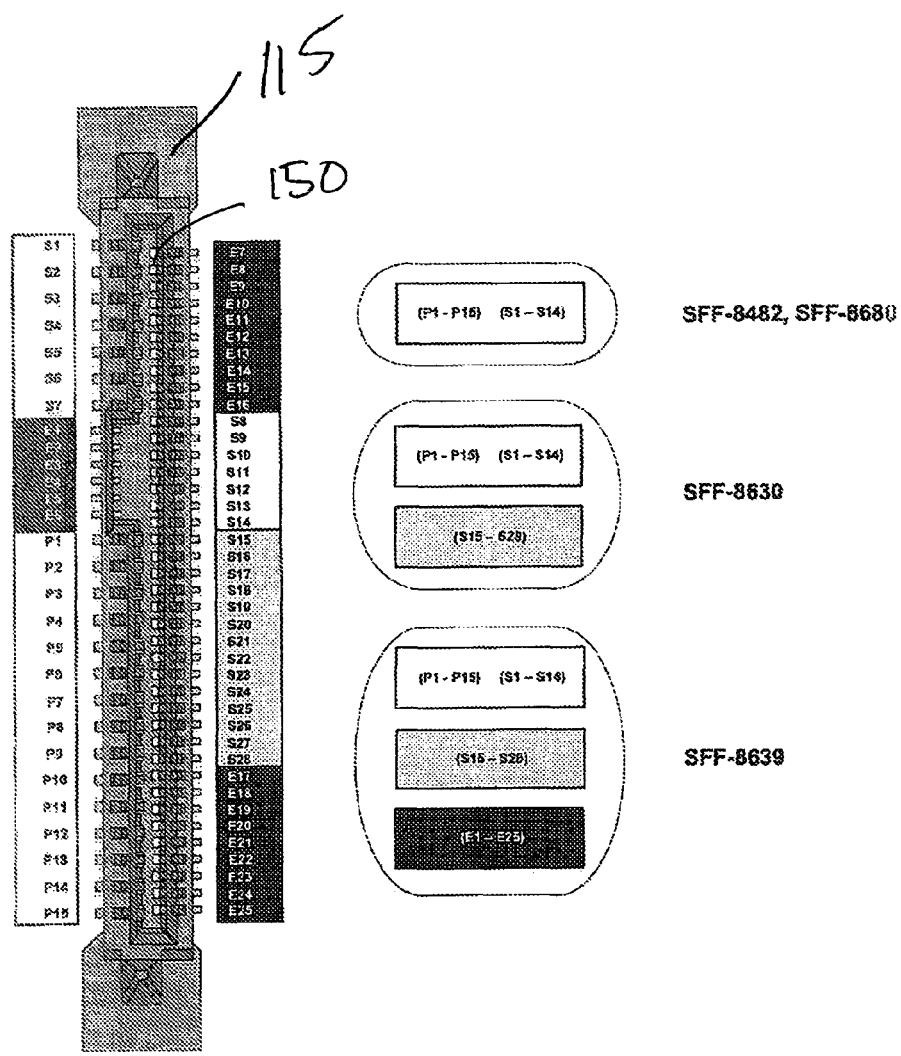
FIG. 14 is a schematic drawing of the pin configuration of the receptable of FIG. 11.

Referring to FIG. 14 a schematic drawing shows the pin configuration of the receptacle 150

Figure 15:
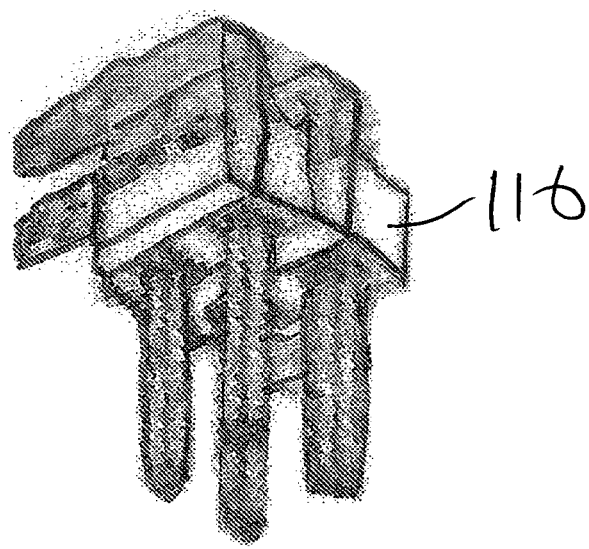
FIG. 15 is a perspective drawing of one of the four pin, inverted L-shaped conductive supports of FIG. 2.

Referring to FIG. 15 in conjunction with FIG. 10 one of the two four pin, inverted L-shaped conductive supports 116 is shown. The printed circuit board 112 has a first set of four third plated holes 161 and a second set of four third plated holes 162. The tongue 144 has a first set of four fourth plated holes 163 and a second set of four fourth plated holes 164. Each four pin, inverted L-shaped conductive support 116 has a base 165 and four L-shaped pins 166 disposed in and anchored by the base 165. All of the four pin, inverted L-shaped conductive supports 116 provide support for the riser card 114, but serve an electrical purpose in that each of the four pin, inverted L-shaped conductive supports 116 carries either a +5 Vdc and ground for powering the solid state drives 111. Each pin 166 is disposed in and mechanically couples one of the third plated holes to one of the fourth plated holes thereby providing support for the solid state drive 111.

Referring to FIG. 15 in conjunction with FIG. 4 and FIG. 10 each of four screws are inserted into one of the plated holes 126 and threadedly coupled to one of the threaded holes 117 on the rear of the solid state drive 111.

Figure 16:
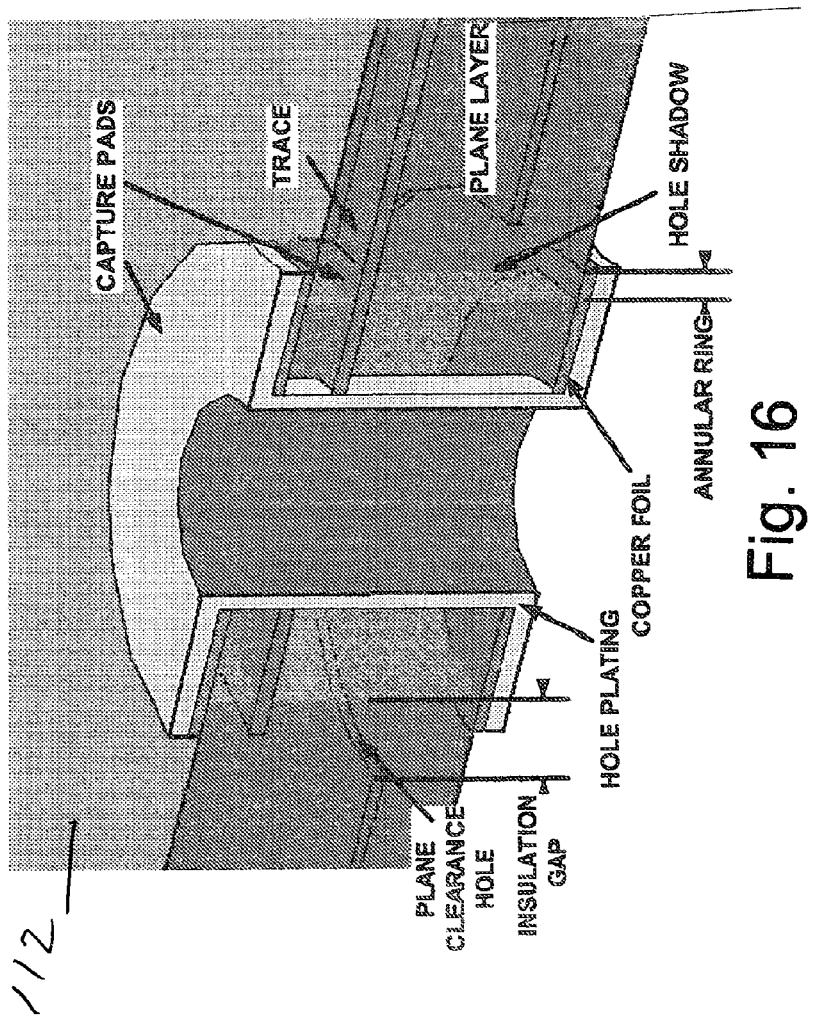
FIG. 16 is a schematic drawing of one of the plated holes of the printed circuit board of FIG. 2.

Referring to FIG. 16 a schematic drawing shows one of the plated holes of the printed circuit board 112.

Figure 17:
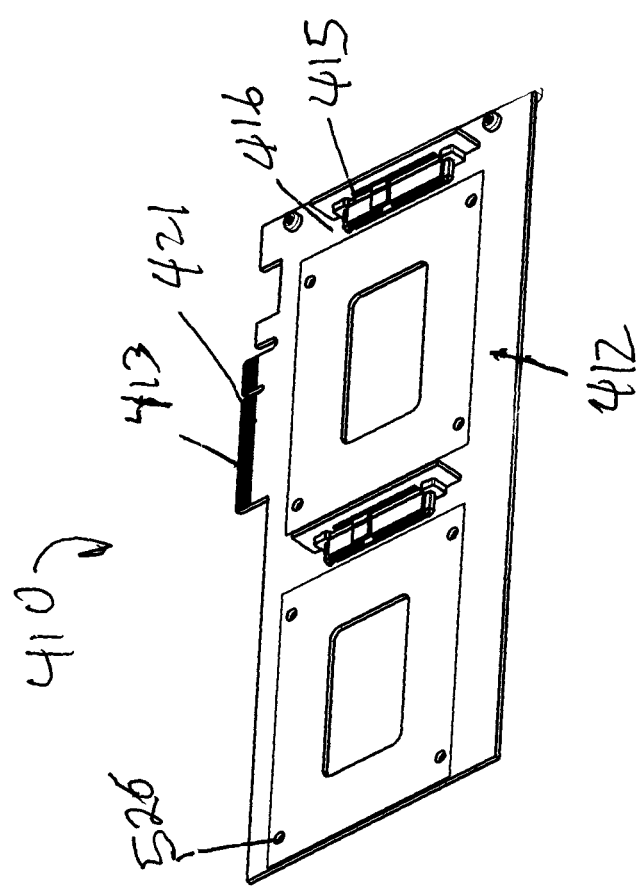
FIG. 17 is a front plan view of a second interface card assembly including a printed circuit board with an edge connector, a first riser card, a first receptacle for containing a first solid-state drive and first pair of four pin, inverted L-shaped conductive supports, a second riser card, a second receptacle for containing a second solid-state drive and a second pair of four pin, inverted L-shaped conductive supports in accordance with the fourth embodiment of the present invention.
Figure 18:
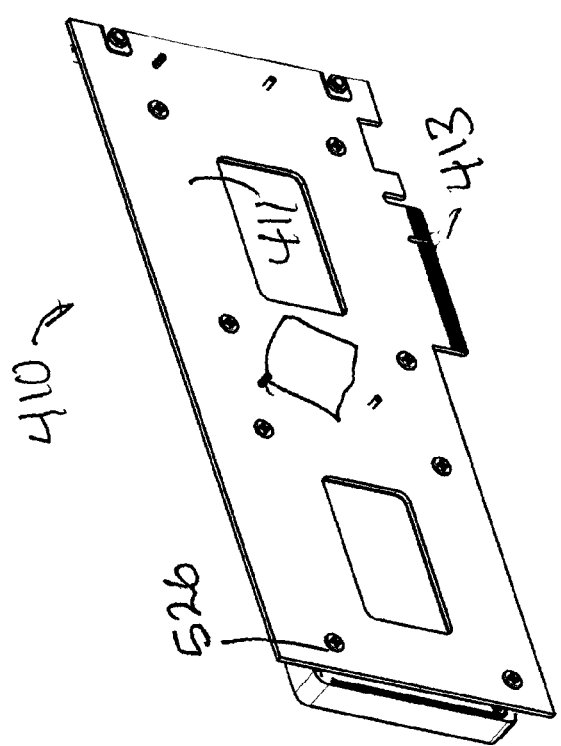
FIG. 18 is a rear plan view of the second interface card assembly of FIG. 17 having a PCIe switch for coupling the first and second solid-state drives.
Figure 19:
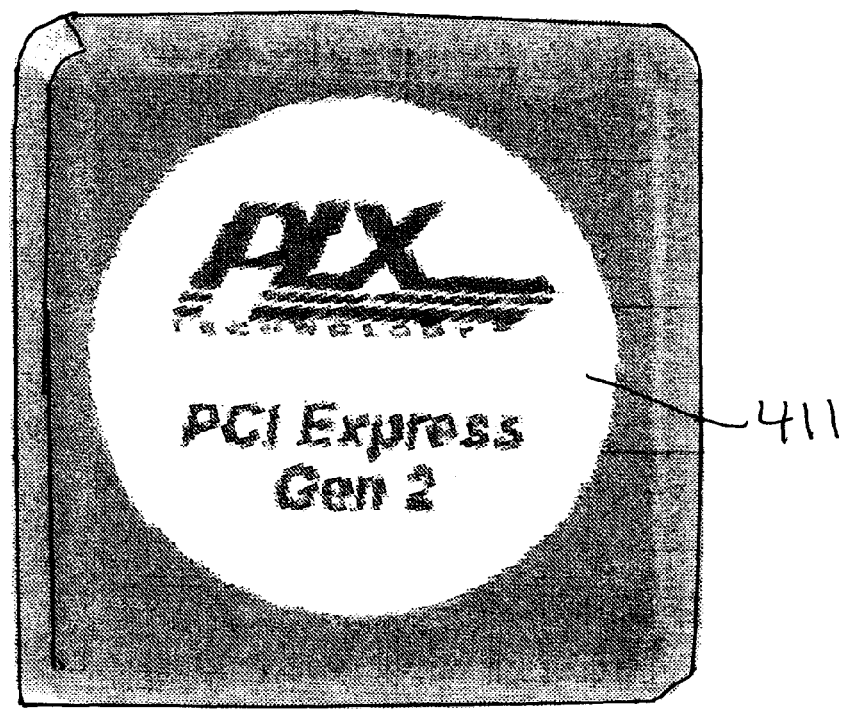
FIG. 19 is a top plan view of the PCIe switch of FIG. 18.
Figure 20:
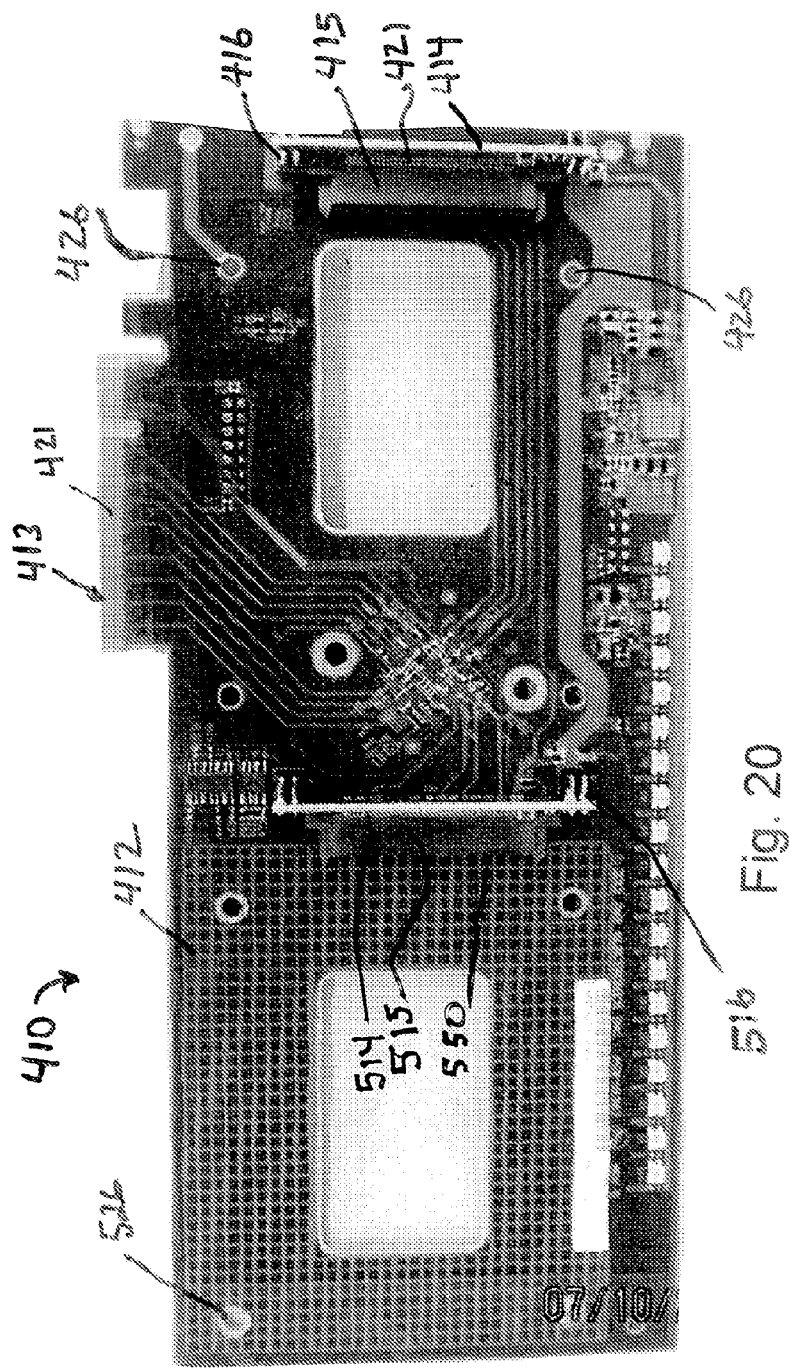
Figure 21:
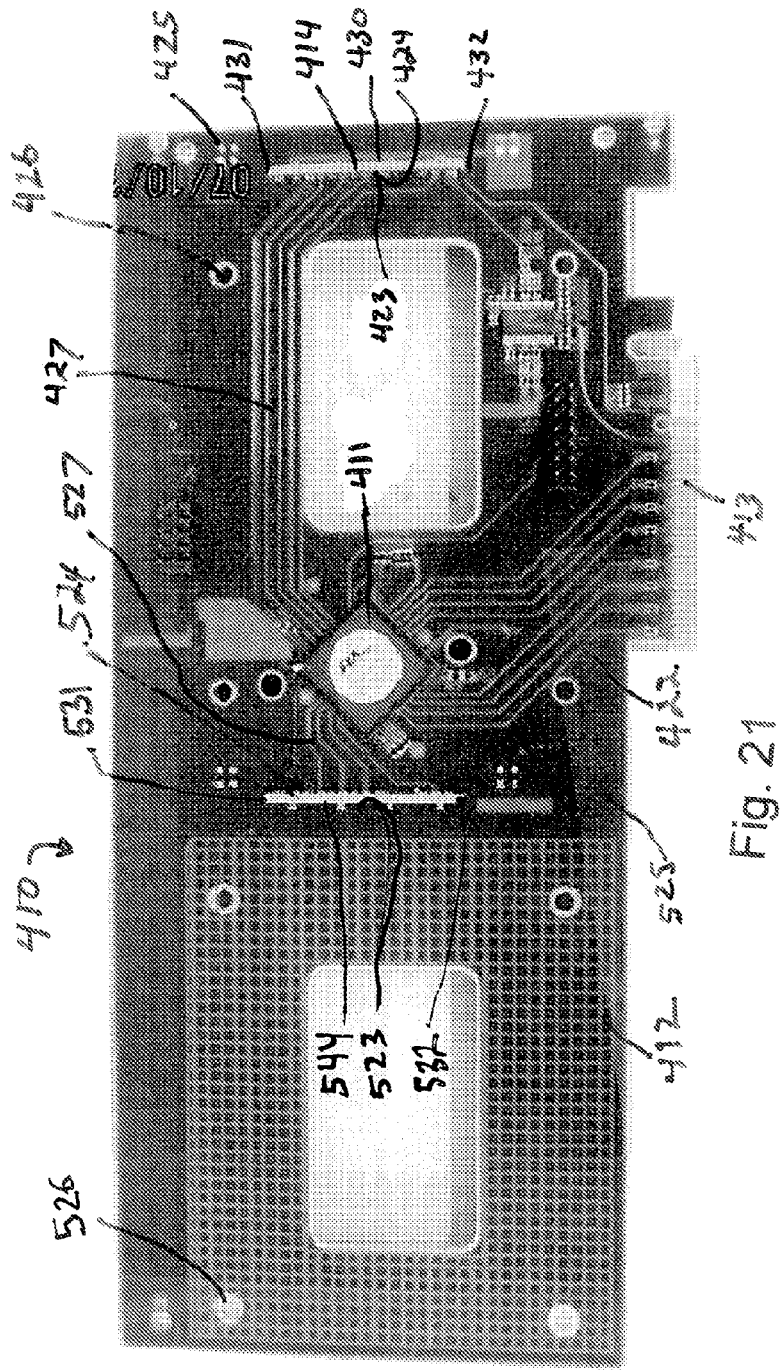
Figure 22:
Figure 23:
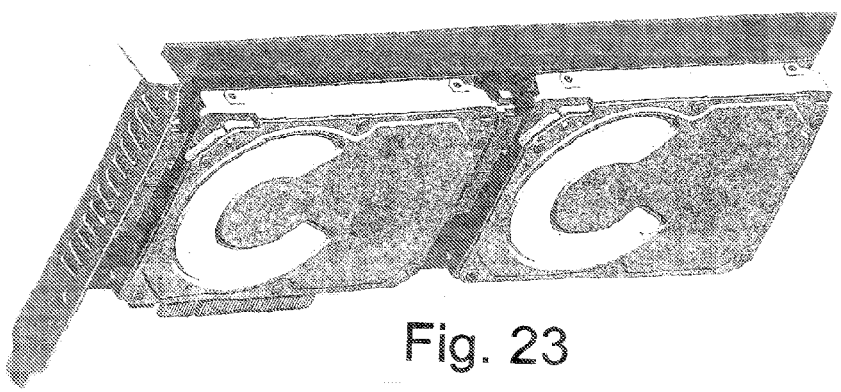
Figure 24:
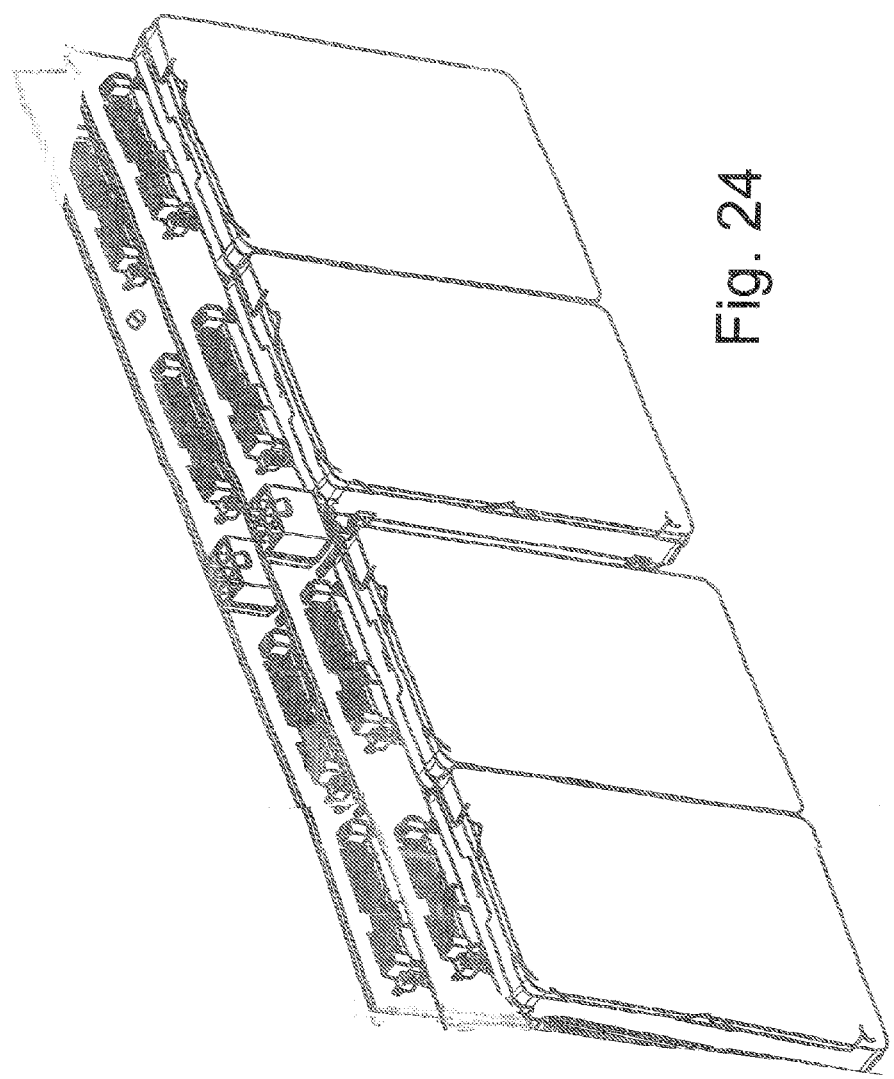
Figure 25:
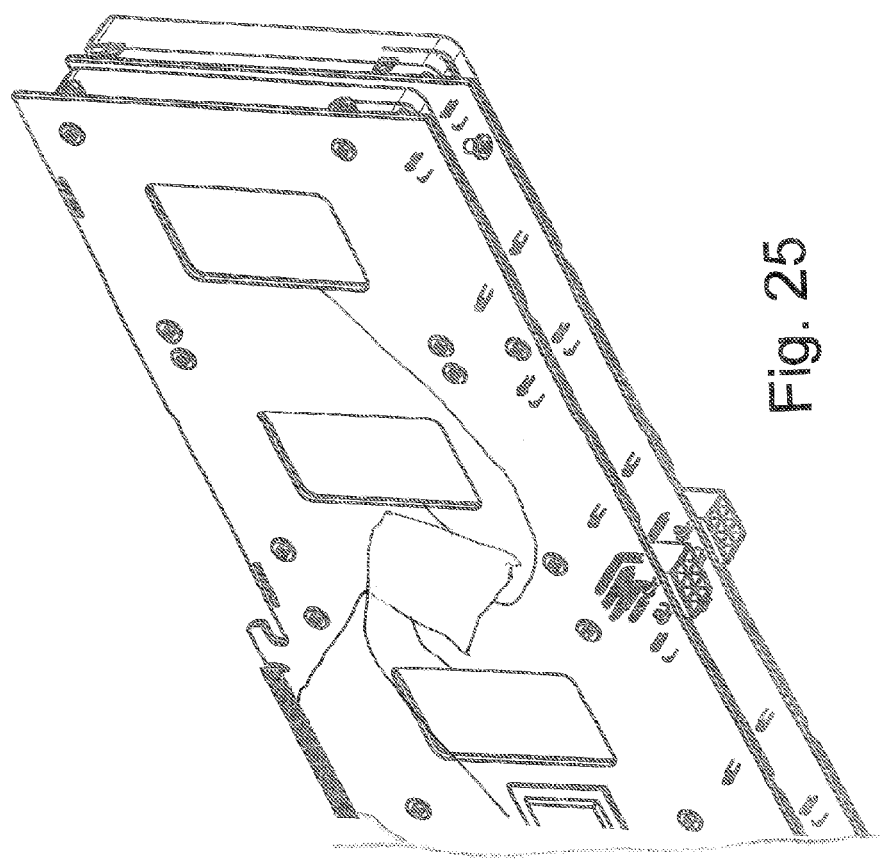

Referring to FIG. 17 in conjunction with FIG. 18 and FIG. 19 a bus extension system includes a second interface card assembly 410 which is able to contain two solid-state drives. The second interface card assembly 410 includes a PCIe switch 411 which has a plurality of inputs, a plurality of first outputs and a plurality of second inputs and which is switchingly coupling the two solid-state drives and couples the solid state drives to a host bus adaptor of a host computer. The second interface card assembly 410 includes a printed circuit board 412 with an edge connector 413, a first riser card 414, a first connector 415 and a first pair of four pin, inverted L-shaped conductive supports 416. The rear of each solid state drive has a threaded hole in each of its four corners. The edge connector 413 has a plurality of first pins 421. The printed circuit board 412 has a plurality of conducting traces 422, a first slot 423, a first plurality of serially aligned semi-cylindrical plated holes 424 adjacent to the first slot 423, a first plurality of first plated holes 425 and a second plurality of second plated holes 426. The first plurality of first serially aligned semi-cylindrical plated holes 424 are disposed along a first center-line 430 having a first end 431 and a second end 432. The center-line 430 is disposed perpendicularly to the edge connector 413. The slot 423 is milled in the printed circuit board 412 so that the first slot 423 is parallel and adjacent to the first center-line 430 and extends beyond the first and second ends 431 and 432 thereby leaving each plated holes 424 in a semi-circular shape. Each conducting trace 422 electrically couples each of the first pins 421 of the edge connector 413 to one the inputs of the PCIe switch 411. Each of a plurality of first connecting traces couples one of the first outputs of the PCIe switch 411 to one of the serially aligned semi-cylindrical plated holes 424. The first plated holes 425 are disposed on the printed circuit board 412 adjacent to the slot 423. The second plated holes 426 is disposed on the printed circuit board 412 so that each plated hole 426 is aligned with one of the threaded holes 417 on the rear of one of the solid state drives. The first riser card 414 has a plurality of second conducting traces and a first plurality of third serially aligned plated holes disposed along a second center-line and a first tongu. Each second conducting trace is electrically coupled to one of the third serially aligned plated holes. The tongue of the first riser card 414 is inserted into the slot 423 of the printed circuit board 412 so that each first semi-circular plated hole 424 may be soldered to one of the second conducting traces. The first connector 415 has a first receptacle and a second plurality of second pins configured for the receptacle. Each second conducting trace is coupled to one of the second pins through one of the third serially aligned plated holes. The first connector 415 is mechanically coupled to the first riser card 414 so that one of the solid state drives may be inserted into the first receptacle. The printed circuit board 412 has a first set of four third plated holes and a second set of four third plated holes. The first tongue has a first set of four fourth plated holes and a second set of four fourth plated holes. Each four pin, inverted L-shaped conductive support 416 has a base and four L-shaped pins 466 disposed in and anchored by the base. All of the four pin, inverted L-shaped conductive supports 416 provide support for the first riser card, but serve an electrical purpose in that each of the four pin, inverted L-shaped conductive supports 416 carries either a +5 Vdc and ground for powering the solid state drives 411. Each pin is disposed in and mechanically couples one of the third plated holes to one of the fourth plated holes thereby providing support for one of the solid state drives. Each of four screws are inserted into one of the plated holes 426 and threadedly coupled to one of the threaded holes on the rear of one of the solid state drives.

Still referring to FIG. 17 in conjunction with FIG. 18 and FIG. 19 the second interface card assembly 510 also includes a second riser card 514, a second connector 515 and a second pair of four pin, inverted L-shaped conductive supports 516. The rear of each solid state drive has a threaded hole in each of its four corners. The edge connector 513 has a plurality of second pins 521. The printed circuit board 512 has a plurality of second conducting traces 522, a second slot 523, a second plurality of serially aligned semi-cylindrical plated holes 524 adjacent to the second slot 523, a second plurality of second plated holes 525 and a second plurality of second plated holes 526. Each of a plurality of connecting traces couples one of the first outputs to one of the serially aligned semi-cylindrical plated holes 424.

A second plurality of second serially aligned semi-cylindrical plated holes 524 are disposed along a second center-line 530 having a second end 531 and a second end 532. The center-line 530 is disposed perpendicularly to the edge connector 513. The second slot 523 is milled in the printed circuit board 512 so that the second slot 523 is parallel and adjacent to the second center-line 530 and extends beyond the second and second ends 531 and 532 thereby leaving each plated holes 524 in a semi-circular shape. Each of a plurality of second connecting traces couples one of the second outputs of the PCIe switch 411 to one of the serially aligned semi-cylindrical plated holes 524. The second plated holes 525 are disposed on the printed circuit board 512 adjacent to the slot 523. The second plated holes 526 is disposed on the printed circuit board 512 so that each plated hole 526 is aligned with one of the threaded holes 517 on the rear of one of the solid state drives. The second riser card 514 has a plurality of second conducting traces 541 and a second plurality of third serially aligned plated holes 542 disposed along a second center-line 543 and a second tongue 544. Each second conducting trace 541 is electrically coupled to one of the third serially aligned plated holes 542. The tongue 544 of the second riser card 514 is inserted into the slot 523 of the printed circuit board 512 so that each second semi-circular plated holes 524 may be soldered to one of the second conducting traces 541. The second connector 515 has a second receptacle 550 and a second plurality of second pins 551 configured for the receptacle 550. Each second conducting traces 541 is coupled to one of the second pins 551 through one of the third serially aligned plated holes 542. The second connector 515 is mechanically coupled to the second riser card 514 so that one of the solid state drives may be inserted into the second receptacle 550. The printed circuit board 512 has a second set of four third plated holes 561 and a second set of four third plated holes 562. The second tongue 544 has a second set of four fourth plated holes 563 and a second set of four fourth plated holes 564. Each four pin, inverted L-shaped conductive support 516 has a base 565 and four L-shaped pins 566 disposed in and anchored by the base 565. All of the four pin, inverted L-shaped conductive supports 516 provide support for the second riser card, but serve an electrical purpose in that each of the four pin, inverted L-shaped conductive supports 516 carries either a +5 Vdc and ground for powering the solid state drives 511. Each pin 566 is disposed in and mechanically couples one of the third plated holes to one of the fourth plated holes thereby providing support for one of the solid state drives. Each of four screws are inserted into one of the plated holes 526 and threadedly coupled to one of the threaded holes on the rear of one of the solid state drives.

From the foregoing it can be seen that an interface card assembly for use in a bus extension system has been described. It should be noted that the sketches are not drawn to scale and that distances of and between the figures are not to be considered significant.

Accordingly it is intended that the foregoing disclosure and showing made in the drawing shall be considered only as an illustration of the principle of the present invention.

What is claimed is:

1. An interface card assembly of a bus extension system for coupling a solid state drive to a host bus adaptor of a host computer, said interface card comprising:
   a. a printed circuit board having an edge connector with a plurality of pins, a plurality of first conducting traces, a plurality of first serially aligned plated holes disposed along a first center-line having a first end and a second and being disposed perpendicularly to said edge connector and a slot wherein said slot is milled in said printed circuit board so that said slot is parallel and adjacent to said first center-line and extends beyond said first and second ends thereby leaving each of said first plated holes in a semi-circular shape and wherein each of said first conducting traces electrically couples one of said pins of said edge connector to one of said first plated holes;
   b. a riser card having a plurality of second conducting traces and a plurality of second serially aligned plated holes disposed along a second center-line and a tongue wherein each of said second conducting traces is electrically coupled to one of said second plated holes wherein said tongue is snugly inserted into said slot of said printed circuit board so that each of said first semi-circular plated holes may be soldered to one of said second conducting traces; and
   c. a connector having a receptacle and a plurality of second pins configured for said receptacle wherein each of said second conducting traces is coupled to one of said second pins through one of said second plated holes and wherein said connector is mechanically coupled to said riser card so that the solid state drive may be inserted into said receptacle.

2. An interface card assembly of a bus extension system for coupling a solid state drive to a host bus adaptor of a host computer according to claim 1 wherein said printed circuit board has a first set of four third plated holes and a second set of four third plated holes and said tongue has a first set of four fourth plated holes and a second set of four fourth plated holes and wherein said interface card assembly includes a first L-shaped support with a first base and first four pin set and a second L-shaped support with a second base and second four pin set wherein each of said pin sets is disposed in and mechanically couples one said third plated holes to one of said fourth plated holes thereby providing both support and an electrical interface for the solid state drive.

3. An interface card assembly of a bus extension system for coupling a solid state drive to a host bus adaptor of a host computer according to claim 2 wherein said printed circuit board has a four hole group which are aligned with four threaded holes of the solid state drive thereby allowing use of four screws to inserted therein in order to provide additional support for the solid state drive.

\* \* \* \* \*